United States Patent
Hansen et al.

(10) Patent No.: US 11,503,153 B1
(45) Date of Patent: Nov. 15, 2022

(54) METHOD AND APPARATUS FOR DETERMINING AN ON-HOLD QUEUE POSITION OF A CALL

(71) Applicant: UIPCO, LLC, San Antonio, TX (US)

(72) Inventors: Gregory David Hansen, San Antonio, TX (US); Megan Sarah Jennings, San Antonio, TX (US); Emily Margaret Gray, San Antonio, TX (US); Gregory B. Yarbrough, San Antonio, TX (US); Charles Balasingh, San Antonio, TX (US); Janelle Denice Dziuk, Falls City, TX (US); Samip Dilip Mehra, Peoria, AZ (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/216,149

(22) Filed: Mar. 29, 2021

Related U.S. Application Data

(60) Provisional application No. 63/001,634, filed on Mar. 30, 2020.

(51) Int. Cl.
*H04M 3/428* (2006.01)
*H04M 3/51* (2006.01)
*H04Q 9/00* (2006.01)

(52) U.S. Cl.
CPC ......... *H04M 3/428* (2013.01); *H04M 3/5116* (2013.01); *H04M 3/5183* (2013.01); *H04Q 9/00* (2013.01); *H04M 2242/04* (2013.01)

(58) Field of Classification Search
None
See application file for complete search history.

(56) References Cited

U.S. PATENT DOCUMENTS

| | | | |
|---|---|---|---|
| 5,646,988 A * | 7/1997 | Hikawa | H04M 3/36 379/266.01 |
| 2007/0168537 A1* | 7/2007 | Misra | H04L 65/1069 709/230 |
| 2008/0175374 A1* | 7/2008 | Lauridsen | H04M 3/5191 379/266.1 |

* cited by examiner

*Primary Examiner* — Hemant S Patel
(74) *Attorney, Agent, or Firm* — Potomac Law Group, PLLC

(57) ABSTRACT

Technology for determining a queue position of a call from a user can include receiving, at an enterprise, the call from a user device associated with the user. The user device includes an application associated with the enterprise. The call is placed into an on-hold queue. A weighted level of importance associated with the call is determined based on call history information associated with the user device and call frequency associated with the user. The weighted level of importance is compared to at least one weight threshold. A wait time for the call is decreased based on the weighted level of importance meeting or exceeding the at least one weight threshold.

18 Claims, 4 Drawing Sheets

METHOD AND APPARATUS FOR DETERMINING AN ON-HOLD QUEUE POSITION OF A CALL

CROSS-REFERENCE TO RELATED APPLICATION(S)

This application is a non-provisional of and claims priority to U.S. Provisional Application No. 63/001,634, filed on Mar. 30, 2020, entitled "METHOD AND APPARATUS FOR DETERMINING AN ON-HOLD QUEUE POSITION OF A CALL," which is hereby incorporated by reference in its entirety for all purposes.

TECHNICAL FIELD

This disclosure is directed generally to systems, methods, and apparatus for decreasing a caller's on-hold wait time with a call center when predetermined conditions are satisfied.

BACKGROUND

When a person calls an organization's customer service phone number, he or she is often placed into a call hold queue. Depending upon factors such as time of day, weather, day of the week, and number of customer service representatives available to take calls, a caller may wait a long time to talk to a customer service representative. Some situations cannot be resolved digitally, while other situations may be dangerous or undesirable for a caller to wait an extended time for the next available representative. Accordingly, it is desirable to identify the callers who may need or benefit from expedited assistance.

Figure 1:
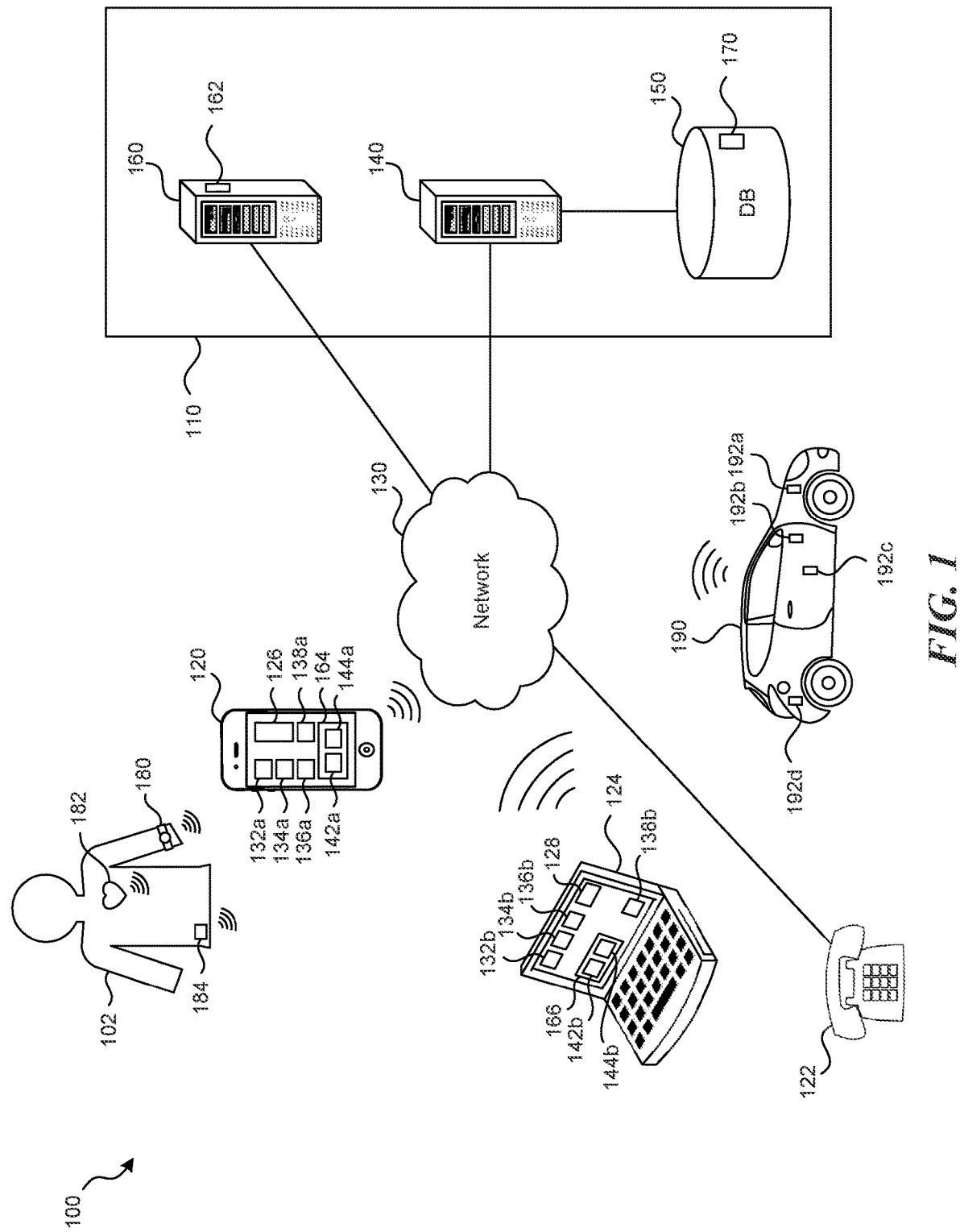
FIG. 1 shows an example of a call center system that can determine a queue position within an on-hold queue for a call from a user in accordance with embodiments of the present technology.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A call center system can accept a call and place a caller or user into an on-hold queue. As used herein, a person calling into the call center system is generally referred to as a "user". In some cases, the calls may be answered in the order in which they are received. At times the wait can be long, and it can be advantageous to answer some calls in a more expedited manner. For example, a user may be experiencing an event such as an accident or be calling during a time period in which the user may need more immediate service. In other embodiments, if the user typically communicates with the enterprise digitally, a call can indicate that the user has been unable to resolve their issue electronically and thus requires assistance. Also, some users such as minors, dependents on accounts, and those with disabilities may be unable to effectively resolve their issue electronically.

To overcome at least some of the issues described above for an on-hold system, this patent document describes systems, apparatus, and methods for determining an adjustment of a user's on-hold wait time based on one or more reasons that can indicate why they are calling. Such a technique can improve routing and call wait times because it considers caller frequency as well as environmental factors, thus identifying those whose questions may be better suited to be answered digitally and those who need assistance more quickly, providing a technical solution to identifying priority callers. Additionally, the disclosed system can identify those in distress and provide quicker service. The example headings for the various sections below are used to facilitate the understanding of the disclosed subject matter and do not limit the scope of the claimed subject matter in any way. Accordingly, one or more features of one section can be combined with one or more features of another section.

I. Identify User and Determine a Level of Importance

FIG. 1 shows an example of a call center system 100 that can determine a queue position within an on-hold queue for a call from a user 102 in accordance with embodiments of the present technology. The user 102 of a user device 120, 122, 124 can call a number to talk to customer service representatives at an enterprise 110, which in some embodiments may be a customer call center of a business. The call from the user device 120, 122, 124 can be sent to or can be managed by a call routing server 140. In some embodiments, the user device 120 may be a mobile device such as a wearable, cellular or smart phone, the user device 122 may be a landline, and the user device 124 may be a computer or tablet. The user devices 120, 124 that are not a landline may include an application 126, 128 loaded thereon that is associated with the enterprise 110.

A call initiated by the user device 120, 122, 124 can be sent to the call routing server 140 via a communication network 130. The communication network 130 may include the Internet, a cellular network, a public switched telephone network (PSTN), a voice over Internet Protocol (VOIP) network, or any combination thereof. The call routing server 140, at least one database 150, and an on-hold server 160 may be configured to communicate with each other over the communication network 130 wirelessly or can be hard-wired or integrated with each other. The components within the enterprise 110 may be co-located at the same location or may be geographically distributed.

The call routing server 140 can transfer a call to the on-hold server 160, and the call can be placed in an on-hold queue 162. The on-hold queue 162 can include one list of users where the user who has been waiting the longest is the next served. Alternatively, multiple lists of users can be maintained within the on-hold queue 162, where users who have a priority status may be on one list, and separate lists may be defined for customer service representatives who address particular types of questions or concerns. The call routing server 140 and/or the on-hold server 160 can include or can be connected to at least one database 150 that can store customer information in a user profile 170. The user profile 170 can include information such as telephone numbers, addresses, familial relationships, requests for disability accommodation, and call frequency (e.g., how often the user 102 calls the enterprise 110). In some embodiments, a single server or more than one server may accomplish the various operations described herein of the call routing server 140 and the on-hold server 160.

While the call is in the on-hold queue 162, the on-hold server 160 can evaluate one or more pieces of information associated with the user 102 to determine if the call has a weighted level of importance. Some information may be stored in the user profile 170. Other information can be requested from and/or automatically transmitted to the enterprise 110 from devices and/or sensors associated with the user 102.

For example, the user device 120, 124 can transmit its associated call history 132 (identified individually as 132a and 132b). The on-hold server 160 can process the call history 132 to determine whether the user 102 has called an emergency number (e.g., 911). In some embodiments, the on-hold server 160 can determine if an emergency call was placed within a predetermined time period of the call to the enterprise 110, such as within an hour or two hours of the call. Information such as global positioning system (GPS) coordinates 134 (identified individually as 134a and 134b), accelerometer data 136 (identified individually as 136a and 136b), and browser history 138 (identified individually as 138a and 138b) can also be transmitted.

Some information may be transmitted from various devices associated with the Internet of Things (IoT). For example, the user 102 can be wearing one or more wearable items such as a watch 180 that collect health data such as pulse rate, body and/or ambient temperature, activity (e.g., type of activity, step count, duration, intensity), and time and quality of sleep, as well as location (e.g., GPS coordinates). The watch 180 can regularly collect and transmit data to the user device 120, 124 and/or the network 130. Additional IoT devices may be associated with the user 102 to acquire health data, such as a pacemaker 182 and insulin pump 184 that also communicate with the user device 120, 124 and/or the network 130.

Additionally, data associated with a user's vehicle 190 can be used to help determine if the call has a high level of importance. For example, sensors 192 (indicated separately as 192a, 192b, 192c and 192d) can detect negative or dangerous situations and/or movement patterns that may have occurred or are currently occurring (e.g., impact, excessive speed, sudden changes in speed, airbag deployment, tire pressure, orientation of vehicle, an associated call to an emergency service (e.g., OnStar) was initiated by the vehicle 190 or from within the vehicle 190, and vehicle rollover). The sensors 192 can transmit data to the communication network 130 and to the enterprise 110. In some embodiments more than one vehicle 190 can be associated with the user profile 170 and GPS data from the user device 120, 124 and the vehicle 190 can be used to determine if the user 102 is located near a vehicle 190 that has transmitted sensor data.

In some embodiments, the application 126, 128 can identify, receive and/or request some or all of the data associated with the user 102, the user device 120, 124 and/or the user's vehicle 190 and send the data to the enterprise 110. In other embodiments, the on-hold server 160 can request that additional data be transmitted and/or regularly updated, such as heart rate information from the watch 180 and/or pacemaker 182 and data from the GPS 134.

Based on at least some of the data associated with and received from the user device 120, 124 and the user's vehicle 190, as well as any wearables associated with the user 102, the on-hold server 160 can determine a weighted level of importance associated with the call. In some embodiments, in response to the weighted level of importance exceeding a predetermined weight threshold, the on-hold server 160 can decrease a wait time for the call by moving the user call to a different position in the on-hold queue 162 or into a different on-hold queue 162.

If the weighted level of importance meets or exceeds one or more predetermined weight threshold, a checklist 142 (indicated separately as 142a and 142b) and/or list of options 144 (indicated separately as 144a and 144b) can be identified. A different checklist 142 or list of options 144 can be used for different identified factors or situations. For example, when the on-hold server 160 determines that a vehicle accident or flat tire may have occurred, a first checklist 142 can be sent to the user device 120, 124. If no negative data is received and browser history 138 and/or use of the application 126, 128 indicates that the user 102 was trying to complete an action or find information, the on-hold server 160 can select a list of options 144 that can present different digital options to the user 102 that may help them resolve their issue more quickly compared to waiting for a service representative.

The checklist 142 and/or list of options 144 can be sent to the user device 120, 124 via the application 126, 128 or by opening a chat window 164, 166 on the corresponding user device 120, 124. In some embodiments, the on-hold server 160 can send a link to the user device 120, 124 via text and/or email that will allow the chat window 164, 166 to open, or the link can launch a browser window. The application 126, 128 and the chat window 164, 166 can allow the user to communicate electronically with the enterprise 110 as discussed further below. The chat window 164, 166 can be any type of electronic window displayed on the screen of the user device 120, 124, and can accept input via any allowable input of the user device 120, 124 (e.g., keyboard, mouse, microphone, and/or touchscreen).

Figure 2:
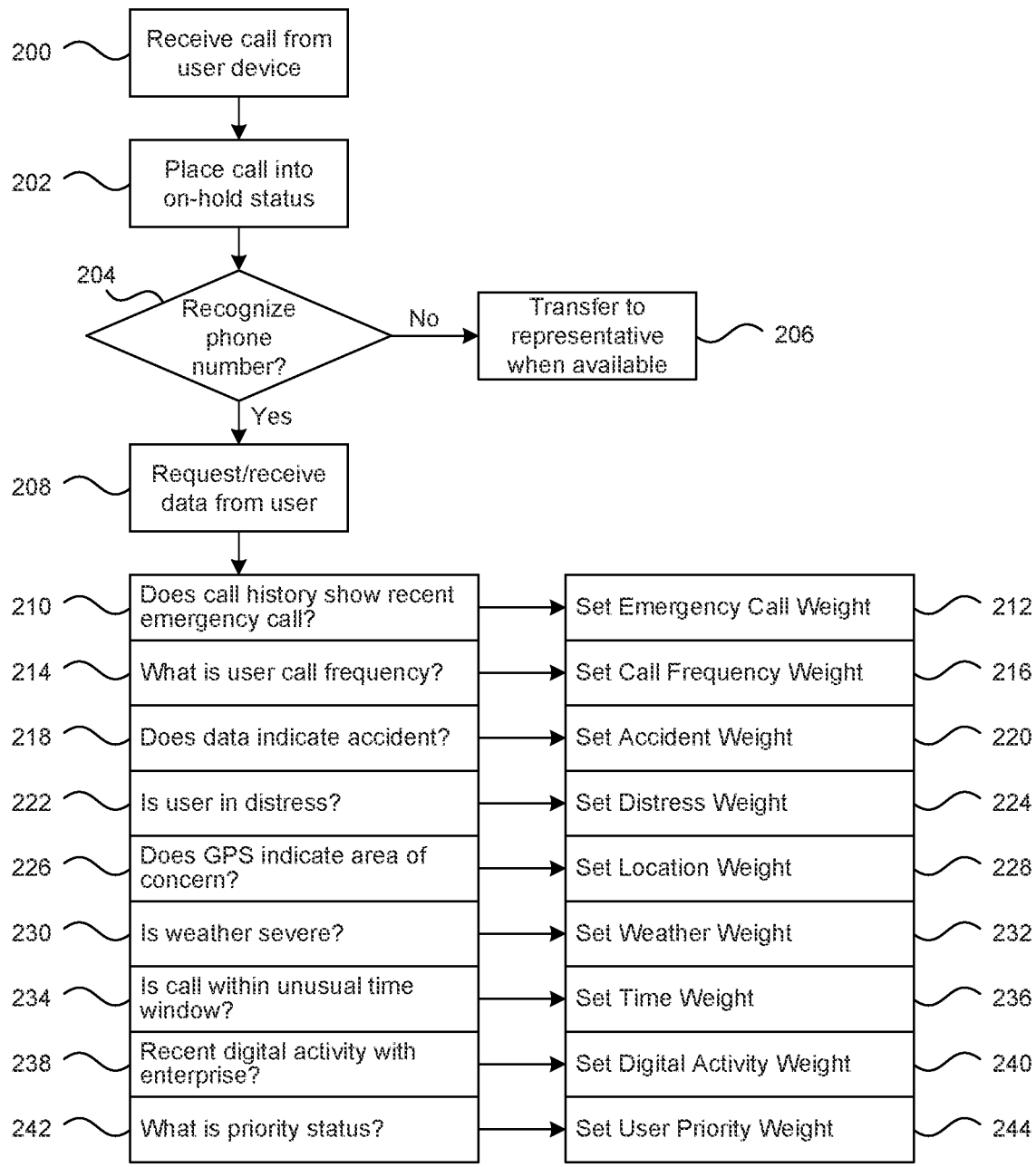
FIG. 2 shows an example process and a table of factors that can be used to identify the user and determine the intent of the user's call in accordance with embodiments of the present technology.

FIG. 2 shows an example process and a table of factors that can be used to identify the user and determine the intent of the user's call in accordance with embodiments of the present technology and will be discussed together with some of the elements of FIG. 1. At operation 200, the enterprise 110 receives a call from one of the user devices 120, 122, 124. At operation 202 the call routing server 140 places the call into an on-hold status, such as by placing the call into the on-hold queue 162 of the on-hold server 160.

At operation 204 the on-hold server 160 determines whether the call is associated with a user profile 170, such as by comparing the phone number to known numbers stored in the database 150. If the call routing server 140 cannot determine the phone number associated with the call, the phone number is not associated with a user profile 170 or the device cannot otherwise be identified and matched with a user profile 170, the method passes to operation 206.

At operation 206, the call remains in the on-hold queue 162 and the on-hold server 160 can transfer the user to a customer service representative as soon as a customer service representative is available. The user 102 can be provided with the same options as any other identified and/or unidentified user in the on-hold queue 162. For example, the user 102 can be presented with a series of options with an Interactive Voice Response (IVR) system. If the enterprise 110 is able to identify the user 102, the method can pass to operation 208.

Returning to operation 204, if the call is associated with a user profile 170, at operation 208 the on-hold server 160 can request and/or receive data from the user 102, the user device 120, 124 and/or the vehicle 190. In some embodiments, the user device 120, 124 can be configured to automatically send data when a call to the enterprise 110 is placed or if the application 126, 128 determines that a call to the enterprise 110 has been initiated. Some examples of data that can be requested and/or automatically transmitted can be associated with the user device 120, 124, such as the call history 132, GPS 134, accelerometer 136, and browser history 138. Other examples can be associated with personal devices such as the watch 180, pacemaker 182 and insulin pump 184, and/or associated with the vehicle 190 such as the vehicle sensors 192.

The requesting, receiving, and/or automatically transmitting data can be implemented in an "opt-in" system in some embodiments. The user 102 can identify one or more user devices 120, 124 that are assigned to their user profile 170, as well as wearables, vehicle sensors, and any other data they choose to share. The application 126, 128 can be used to identify and/or connect with the various devices and sensors, providing a communication conduit between the user device 120, 124 and the enterprise 110.

Based on the received data, the on-hold server 160 identifies possible factors (e.g., one or more factors) that might have prompted the user 102 to call the enterprise 110. Some factors are shown in FIG. 2 and are discussed below. Each of the factors can have one or more weight associated with it. Some factors or situations can be weighted heavier, indicating a greater level of importance or concern compared to others.

Factors other than those discussed in FIG. 2 can also be considered and assigned a weight in some embodiments, while in other embodiments, a scoring or point system can be used. In some embodiments, if no data associated with a particular factor is received, the factor weight can be assigned a zero value. Also, in other embodiments a subset of the factors shown in FIG. 2 can be considered. Additionally, the factors discussed in FIG. 2 are not limited to the order in which they are presented.

At operation 210 of FIG. 2, the on-hold server 160 analyzes the call history 132 to determine whether an emergency call has been made or attempted within a predetermined time period, such as within one hour or two hours prior to the call to the enterprise 110. Other time periods may be used. In some embodiments this may indicate that an accident has occurred and the user 102 needs immediate assistance or is not able to successfully navigate the digital process to report the accident. If the on-hold server 160 determines that an emergency call was made or attempted, a non-zero or positive emergency call weight can be set at operation 212.

At operation 214 the on-hold server 160 determines the call frequency of the user 102 and compares it to a call frequency threshold. Call frequency information can be included in the user profile 170, and can be updated every time the user 102 calls the enterprise 110. In some embodiments the call frequency threshold can be set at two calls a month or two calls a year. An infrequent caller, therefore, can be identified as a user 102 who calls less frequently than the call frequency threshold, while a frequent caller calls equal to or more frequently compared to the call frequency threshold. Other thresholds can be used. For example, a high frequency caller may be someone who does not engage with the enterprise 110 digitally, but chooses to conduct business (e.g., checking account balances, verifying payment is made) with a customer service representative. If the user 102 is an infrequent caller it is possible that the user 102 has been unable to resolve their issue digitally or is experiencing a situation in which they require faster or a higher level of service. Therefore, if the on-hold server 160 determines that the user 102 has a call frequency below the call frequency threshold, the on-hold server 160 can set a non-zero or positive call frequency weight at operation 216.

At operation 218 the on-hold server 160 determines whether a possible accident has occurred. Data from one or both of the user devices 120, 124 can be considered, such as the GPS 134 and accelerometer 136, as well as the user's wearable and/or implantable devices, such as the watch 180, pacemaker 182 and insulin pump 184. Data from the vehicle sensors 192 can also be considered, as well as any data that can provide information regarding damage to the vehicle 190. Data from the user devices 120, 124 such as the GPS 134 and accelerometer 136 could indicate an accident with the vehicle 190, a bike, scooter, or other vehicle that does not have monitored sensors, or that the user 102 has fallen. If the on-hold server 160 determines that a possible accident has occurred, the on-hold server 160 can set a non-zero or positive accident weight at operation 220.

At operation 222 the on-hold server 160 determines whether the user 102 might be in distress. Some of the same data as in operation 218 can be considered. Health data such as an elevated heart rate sensed by the watch 180 and/or pacemaker 182 could indicate that the user 102 is in distress. If the on-hold server 160 determines that the user 102 may be in distress, the on-hold server 160 can set a non-zero or positive distress weight at operation 224.

At operation 226 the on-hold server 160 determines whether the user device 120, 124 is within a predetermined area. The on-hold server 160 can consider the GPS 134 as well as any GPS data from the vehicle 190. Additional factors to consider can be mapping that can indicate heavy traffic in the same area or can indicate an area that has a high accident rate. This data can be stored in the database 150 separately or accessed from other providers over the network 130. If the on-hold server 160 determines that the user 102 is calling from an area with heavy traffic or an elevated accident rate, the on-hold server 160 can set a non-zero or positive location weight at operation 228.

At operation 230 the on-hold server 160 determines if the weather where the user device 120, 124 is calling from could indicate a need for immediate assistance. For example, the on-hold server 160 can consider the GPS 134, the GPS data from the vehicle 190, as well as external weather data. In some embodiments the on-hold server 160 can request data from a weather application loaded on the user device 120, 124 that could indicate location and weather conditions. Severe weather could indicate that road conditions are treacherous and/or the user 102 is experiencing extremely high or low temperatures, and thus the user 102 requires more immediate assistance. If the on-hold server 160 determines that the weather could indicate a need for assistance, the on-hold server 160 can set a non-zero or positive weather weight at operation 232.

At operation 234 the on-hold server 160 determines whether the call is received during an unusual time window. For example, the on-hold server 160 may compare the call time to previous call times and digital activity in the user profile 170. If the call is at an unusual time, such as the middle of the night wherein the user 102 generally calls or accesses the enterprise 110 during the day, the on-hold server 160 may determine that the user 102 is not calling with a general question about their accounts or to inquire about insurance, but instead needs more immediate assistance. If the on-hold server determines that the time of the call could indicate an elevated need for assistance, the on-hold server 160 can set a non-zero or positive time weight at operation 236.

At operation 238 the on-hold server 160 determines whether the user 102 has recently or is actively engaged with the enterprise 110 on the application 126, 128 or in a different browser window. The on-hold server 160 can determine if the activity has occurred within a predetermined time period of the call to the enterprise 110, such as within one hour or two hours. This may indicate that the user 102 has been unable to resolve their issue digitally. In some embodiments, the user 102 can have a question or requirement that a specialized customer service representative can resolve or their issue is not a standard question that can be easily resolved using IVR. If the on-hold server 160 determines that the user 102 needs a non-digital resolution of their issue, the on-hold server 160 can set a non-zero or positive digital activity weight at operation 240.

At operation 242 the on-hold server 160 determines if the phone number is associated with a high priority user. Data identifying the user 102 as a high priority user can be stored in the user profile 170. In some embodiments, a high priority user can be a minor or a dependent on their parent/guardian's account, a user 102 with a disability that makes digital interaction with the enterprise 110 impossible or difficult, or any user 102 who has been identified as someone who should receive faster service when they call the enterprise 110. If the on-hold server 160 determines that the user 102 is a high priority user, the on-hold server 160 can set a non-zero or positive user priority weight at operation 244.

II. Determine a Weighted Level of Importance Associated with the Call

Figure 3:
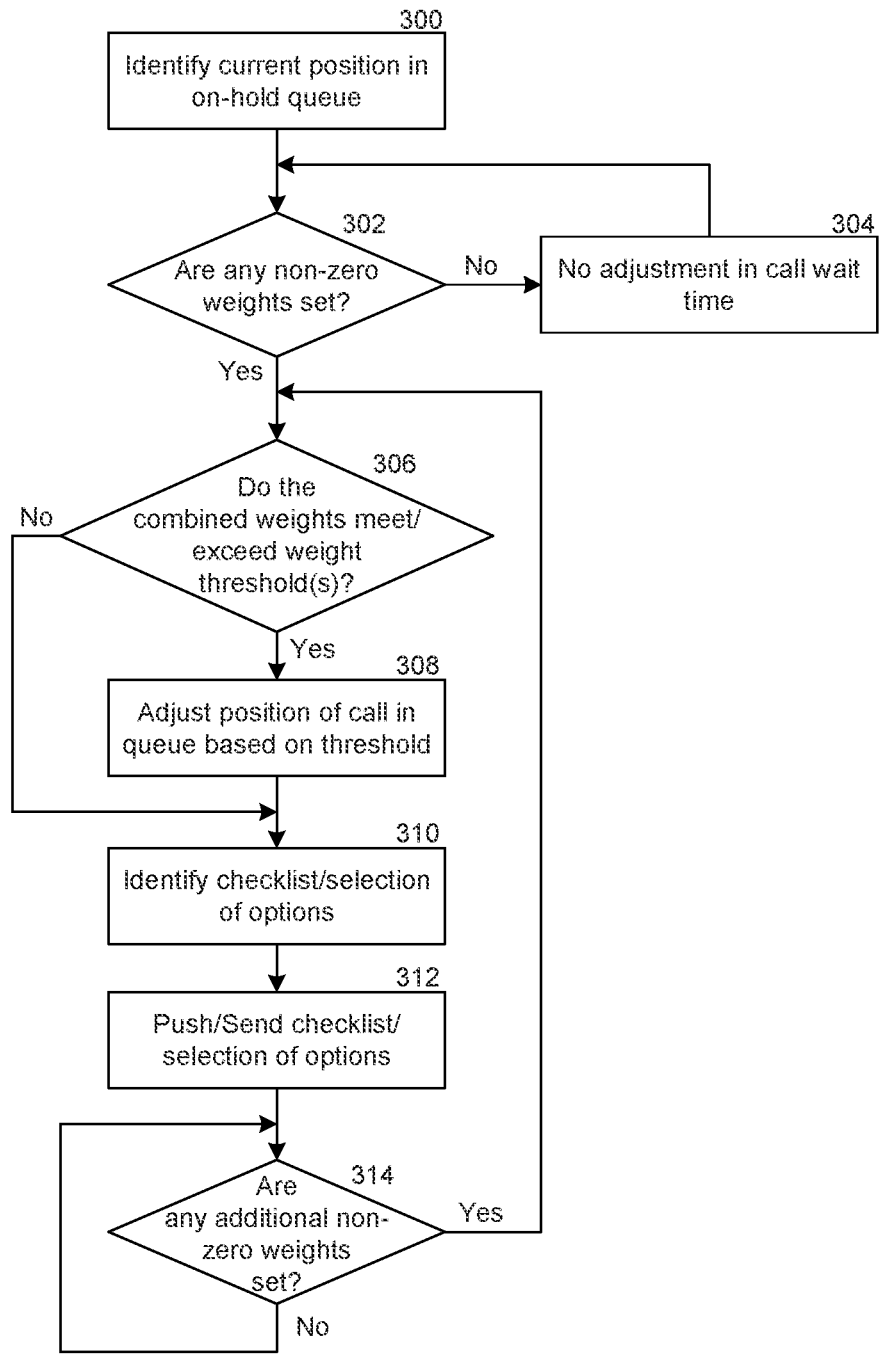
FIG. 3 shows an example process for determining a weighted level of importance associated with the user's call and adjusting a wait time of the user's call based on the weighted level of importance in accordance with embodiments of the present technology.

FIG. 3 shows an example process for determining a weighted level of importance associated with the user's call and adjusting a wait time of the user's call based on the weighted level of importance in accordance with embodiments of the present technology. As discussed in FIG. 2, a weight, score or point system can be applied to each of the evaluated factors.

At operation 300 the on-hold server 160 determines the position of the user's call in the on-hold queue 162. Based on historical data, the on-hold server 160 can estimate a potential wait time for the user 102.

At operation 302 the on-hold server 160 determines whether any non-zero weights have been set. In one embodiment the same factors can be evaluated for all of the participating users 102 of the enterprise 110, while in other embodiments, a subset of factors or a second set of factors can be evaluated for a subset of the participating users 102. For example, a set of users 102 located in a first region of a country can be assigned a first subset of factors while a second set of users 102 located in a second region of the country can be assigned a second subset of factors. In the example of FIG. 3, the on-hold server 160 determines whether any non-zero weights are set in association with any of the factors considered in FIG. 2.

If no non-zero weights are set, at operation 304 no adjustment to the weighted level of importance associated with the call is made, and thus no adjustment is made to the user's call wait time. The method returns to operation 302 as the on-hold server 160 continues to monitor for data associated with the user 102 that may result in a non-zero weight being set.

If any non-zero weights are set at operation 302, at operation 306 the on-hold server 160 determines whether the weight and/or combined weights from more than one factor meets or exceeds one or more weight threshold. The weight threshold(s) can be correlated to a level of importance associated with the call. In one embodiment, a single weight threshold can be set and when the weights meet or exceed the weight threshold, the call has a high level of importance. In other embodiments, multiple weight thresholds corresponding to increasing weights and increasing levels of importance can be set, and when the weights meet or exceed one of the weight thresholds, an increasing level of importance is determined for the call. If a weight threshold is not met at operation 306, the method passes to operation 310.

If a weight threshold is met or exceeded, at operation 308 the on-hold server 160 adjusts the position of the call in the on-hold queue 162 based on the weight threshold. If there is one weight threshold, in some embodiments the on-hold server 160 adjusts the position of the call within the on-hold queue 162 a predetermined amount, such as by moving the call to the top of the on-hold queue 162 so that the call is next to be answered, or moving the call to be the fifth or tenth position from the top of the on-hold queue 162. In other embodiments adjusting the position the call can also be based on how many calls are in the on-hold queue 162, such that the position of the call is adjusted proportionally, such as within five percent or ten percent of the top of the on-hold queue 162. If more than one weight threshold is set, the on-hold server 160 can adjust the position of the call within the on-hold queue 162 based on the highest weight threshold that was met or exceeded. In some embodiments, a higher weight threshold could move the call closer to the top of the on-hold queue 162 compared to a lower weight threshold.

Both of the operations 306 and 308 pass to operation 310 where the on-hold server 160 identifies whether any checklist and/or selection of options associated with any of the factors that have been assigned weights in FIG. 2 are available. In some embodiments each of the factors can be assigned a checklist, while in other embodiments some checklists can be assigned to multiple factors. Also, different checklists and/or selection of options can be provided as a subset of a larger category based on what data is received by the on-hold server 160. There may be a priority assignment wherein one checklist is assigned a higher priority, such as an accident checklist, compared to a different checklist that is assigned a lower priority, such as selection of options to identify whether the user's questions can be answered digitally even though they are calling within an unusual time window.

At operation 312 the on-hold server 160 can push or otherwise send one or more checklists and/or selection of options to the user device 120, 124. As discussed previously, the on-hold server 160 can send a text message or email, launch a chat window 164, 166, and/or initiate the checklist/selection of options through the application 126, 128.

At operation 314 the on-hold server 160 determines if any additional non-zero weights have been set. If no additional non-zero weights have been set, the method remains at operation 314, monitoring for additional weights to be set. If yes, flow returns to operation 306. In some embodiments, at operation 306 a new combined weight can be calculated, and a higher weight threshold may be met or exceeded, indicating a higher level of importance associated with the call. In this case, at operation 308 the on-hold server 160 can adjust the position of the call in the on-hold queue 162 to further decrease the wait time for the call. At operation 310 the on-hold server 160 can determine if any additional checklist/selection of options is appropriate, and at operation 312 can send the additional checklist/selection of options. In another embodiment, the on-hold server 160 can ask the user 102 if they want to switch to a new checklist/list of options, or can modify the offering to include additional items and/or options.

In some embodiments the method of FIG. 3 is iterative; that is, any of the operations can be repeated to continuously check for any or additional non-zero weights, compare the weights to weight threshold(s), adjust the position of the call in the on-hold queue 162 and identify and provide checklists/lists of options to the user 102. Additionally, in some embodiments some weights can be increased when certain combinations of factors are satisfied. For example, when the user 102 has a priority status and an accident may have occurred, one or both of the associated weights can be increased. In another embodiment, if a threshold of factors is met, such as three different factors receiving non-zero weights, the combined weight may be further increased.

Referring to FIGS. 1-3, as discussed previously different weights can be assigned to give different factors higher priority. For example, Emergency Call Weight (set at 212) and Accident Weight (set at 220) can each be assigned a weight of 10. If the on-hold server 160 determines that both of the factors are true, a combined weight of 20 can be determined at operation 304 and compared to one or more weight thresholds. In some embodiments there can be three weight thresholds, a first weight threshold of 5, a second weight threshold of 10 and a third weight threshold of 15. In this example, the combined weight exceeds the third threshold and the position of the call in the on-hold queue 162 can be adjusted a maximum amount to decrease the wait time for the call because the call has a high level of importance. In another example, Digital Activity Weight (set at 240) may be assigned a weight of 3, while the Call Frequency Weight (set at 216) can be assigned a 5. If the on-hold server 160 determines that both of these factors are true, a combined weight of 8 can be determined at operation 304 and compared to one or more thresholds. However, the combined weight of the two factors may be less than the weight of either of the Emergency Call Weight or the Accident Weight, and may exceed the lower first weight threshold of 5. The processes ends when the call is answered or otherwise completed (e.g., the user hangs up, selects an option to continue via a digital channel).

Figure 4:
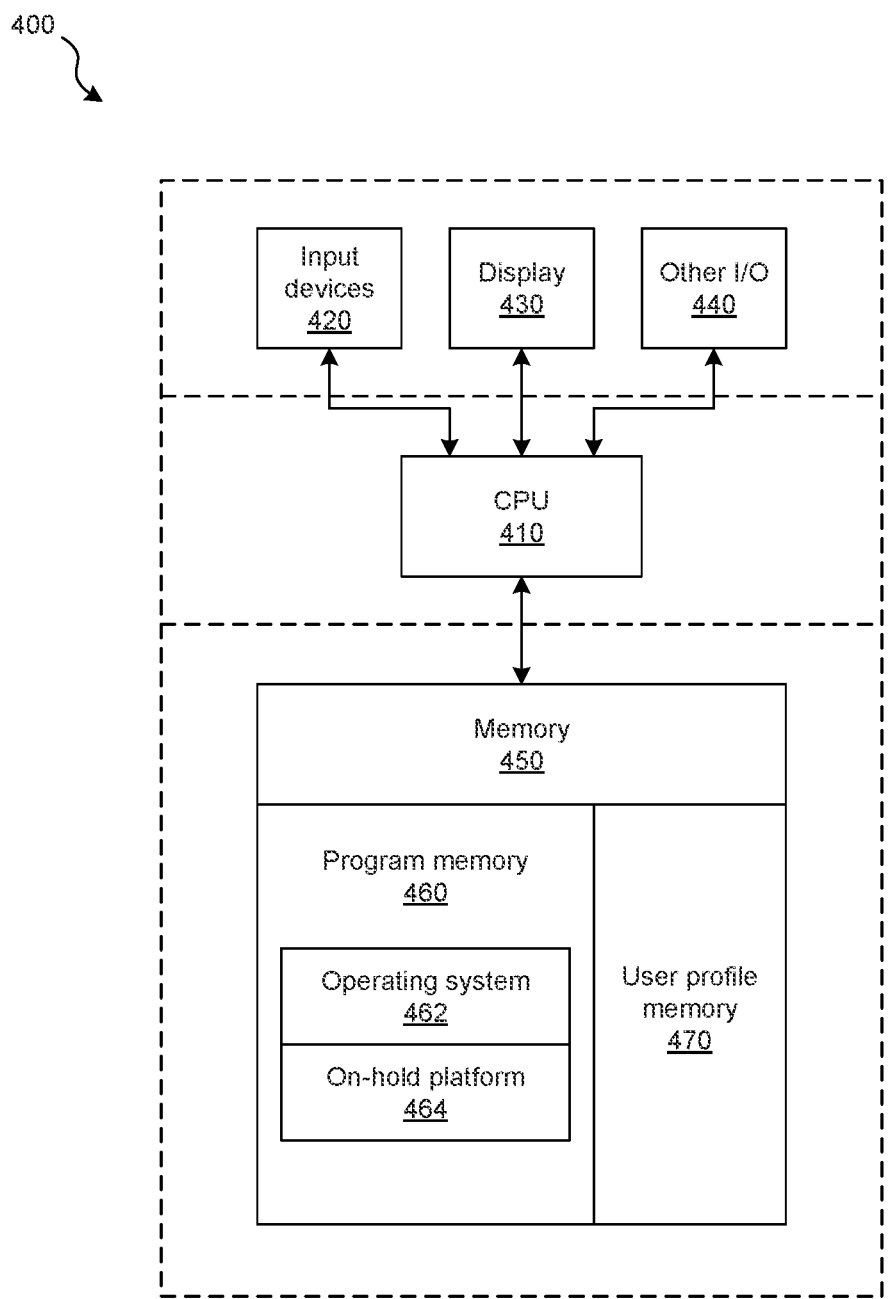
FIG. 4 is a block diagram illustrating an overview of devices on which some implementations of the on-hold server can operate in accordance with embodiments of the present technology.

FIG. 4 is a block diagram illustrating an overview of devices on which some implementations of the on-hold server 160 can operate in accordance with embodiments of the present technology and will be discussed together with some of the elements of FIG. 1. The devices can comprise hardware components of a device 400, such as the on-hold server 160 that includes an on-hold platform 464 that requests and receives data from the user 102, the user device 120, 124, wearables and/or implanted devices 180, 182, 184, and vehicle sensors 192. The on-hold platform 464 also can send communications such as text messages and emails to the user device 120, 124, and launch the chat window 164, 166 via an application 126, 128 on the user device 120, 124 and/or a web browser. The chat window 164, 166 can be opened on the user device 120, 124 that is operating the voice call. Alternatively, the chat window 164, 166 can be opened on a different user device 120, 124 that has the application 126, 128 if the user is signed into the application 126, 128.

Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and the on-hold platform 464. The on-hold platform 464 may include modules or processes or methods for requesting and receiving information from a user 102 and devices and sensors associated with the user 102. The on-hold platform 464 can identify the reason for the user's call and determine a level of importance associated with the call that can be used to adjust the wait time of the call, as described in Sections I and II and FIGS. 1 to 3 of this patent document. The on-hold platform 464 may also include modules for providing checklists and/or lists of options to the user 102 while they are on hold to provide additional information that may assist the on-hold platform 464 in determining the reason for the call and potentially providing a digital solution as described in Sections I and II and in FIGS. 1 to 3 of this patent document. Thus, for example, the memory 450 may store instructions that upon execution by CPU 410 configure the device 400 to perform the operations described for the on-hold server 160 in FIGS. 1 to 3 and/or in the various embodiments described in this patent document. Memory 450 can also include user profile memory 470 that can include preferences associated with users as described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method of determining a queue position of a call from a user, comprising:
   receiving, at an enterprise, the call from a user device associated with the user, wherein the user device includes an application associated with the enterprise;
   placing the call into an on-hold queue;
   determining a weighted level of importance associated with the call based on call history information associated with the user device and call frequency associated with the user by:
      comparing the call frequency to a call frequency threshold; and
      increasing the weighted level of importance in response to the call frequency being below the call frequency threshold;
   comparing the weighted level of importance to at least one weight threshold; and
   decreasing a wait time for the call based on the weighted level of importance meeting or exceeding the at least one weight threshold.

2. The method of claim 1, further comprising:
   identifying a second call to an emergency number in the call history of the user device within a predetermined time period of the call to the enterprise; and
   increasing the weighted level of importance in response to the identifying the second call to the emergency number.

3. The method of claim 1, further comprising:
   receiving, at the enterprise, accelerometer data associated with the user device;
   determining that a possible traffic accident associated with the user has occurred based at least on the accelerometer data; and
   increasing the weighted level of importance in response to determining that the possible traffic accident has occurred.

4. The method of claim 3, wherein the determining that the possible traffic accident has occurred further comprises identifying movement patterns within the accelerometer data that indicate the possible traffic accident.

5. The method of claim 1, further comprising:
   receiving, at the enterprise, at least one of browser history associated with the user and application data associated with the application;
   determining activity associated with the enterprise on at least one of the browser history and the application data within a predetermined time period of the call to the enterprise; and
   increasing the weighted level of importance in response to the determining that the activity associated with the enterprise within the predetermined time period has occurred.

6. The method of claim 1, further comprising:
   determining a phone number associated with the call;
   identifying a priority status associated with the phone number; and
   wherein the determining the weighted level of importance is further based on the priority status.

7. The method of claim 1, further comprising:
   identifying a factor associated with an intent of the call; and
   sending a checklist or a list of options to the user device in response to the identified factor.

8. The method of claim 1, further comprising:
   collecting sensor data from one or more sensors in a vehicle associated with the user;
   collecting health data from a wearable associated with the user; and
   wherein the determining the weighted level of importance of the call is further based on the sensor data and the health data.

9. A system for determining a queue position of a call from a user comprising:
   a server configured to:
      receive, at an enterprise, the call from a user device associated with the user, wherein the user device includes an application associated with the enterprise;
      place the call into an on-hold queue;
      determine a weighted level of importance associated with the call based on call history information associated with the user device and call frequency associated with the user by:
         comparing the call frequency to a call frequency threshold; and
         increasing the weighted level of importance in response to the call frequency being below the call frequency threshold;
      compare the weighted level of importance to at least one weight threshold; and
      decrease a wait time for the call based on the weighted level of importance meeting or exceeding the at least one weight threshold.

10. The system of claim 9, wherein the server is further configured to:
    identify a second call to an emergency number in the call history of the user device within a predetermined time period of the call to the enterprise; and
    increase the weighted level of importance in response to the second call being identified.

11. The system of claim 9, wherein the server is further configured to:
    receive, at the enterprise, at least one of browser history associated with the user and application data associated with the application;
    determine activity associated with the enterprise on at least one of the browser history and the application data within a predetermined time period of the call to the enterprise; and increase the weighted level of importance in response to the activity associated with the enterprise being within the predetermined time period.

12. The system of claim 9, wherein the server is further configured to:
   determine a phone number associated with the call;
   identify a priority status associated with the phone number; and
   wherein the determine the weighted level of importance is further based on the priority status.

13. The system of claim 9, wherein the server is further configured to:
   identify a factor associated with an intent of the call; and
   send a checklist or a list of options to the user device in response to the identified factor.

14. The system of claim 9, wherein the server is further configured to:
   collect sensor data from one or more sensors in a vehicle associated with the user;
   collect health data from a wearable associated with the user; and
   wherein the determine the weighted level of importance of the call is further based on the sensor data and the health data.

15. A non-transitory machine-readable medium having machine executable instructions stored thereon that, when executed by one or more processors, direct the one or more processors to perform a method comprising:
   receiving, at an enterprise, a call from a user device associated with the user, wherein the user device includes an application associated with the enterprise;
   placing the call into an on-hold queue;
   determining a weighted level of importance associated with the call based on call history information associated with the user device and call frequency associated with the user by:
      comparing the call frequency to a call frequency threshold; and
      increasing the weighted level of importance in response to the call frequency being below the call frequency threshold;
   comparing the weighted level of importance to at least one weight threshold; and
   decreasing a wait time for the call based on the weighted level of importance meeting or exceeding the at least one weight threshold.

16. The non-transitory machine-readable medium of claim 15, further comprising:
   identifying a call to an emergency number in the call history of the user device within a predetermined time period of the call to the enterprise; and
   increasing the weighted level of importance in response to the identifying the call to the emergency number.

17. The non-transitory machine-readable medium of claim 15, further comprising:
   receiving, at the enterprise, accelerometer data associated with the user device;
   determining that a possible traffic accident associated with the user has occurred based at least on the accelerometer data; and
   increasing the weighted level of importance in response to determining that the possible traffic accident has occurred.

18. The non-transitory machine-readable medium of claim 17, wherein the determining that the possible traffic accident has occurred further comprises identifying movement patterns within the accelerometer data that indicate the possible traffic accident.

* * * * *